United States Patent
Shen et al.

(10) Patent No.: US 10,061,348 B2
(45) Date of Patent: Aug. 28, 2018

(54) PORTABLE ELECTRONIC DEVICE

(71) Applicant: Acer Incorporated, New Taipei (TW)

(72) Inventors: Chao-Di Shen, New Taipei (TW); Yan-Lin Kuo, New Taipei (TW); Kai-Lin Chang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 15/653,540

(22) Filed: Jul. 19, 2017

(65) Prior Publication Data
US 2018/0196470 A1    Jul. 12, 2018

(30) Foreign Application Priority Data

Jan. 9, 2017  (TW) .............................. 106200331 U
Feb. 7, 2017  (TW) .............................. 106201811 U (51) Int. Cl.
  *G06F 1/16*  (2006.01)
  *G06F 3/0488*  (2013.01)

(52) U.S. Cl.
  CPC ............ *G06F 1/1626* (2013.01); *G06F 1/166* (2013.01); *G06F 1/1643* (2013.01); *G06F 1/1647* (2013.01); *G06F 1/1654* (2013.01); *G06F 1/1656* (2013.01); *G06F 3/0488* (2013.01); *G06F 2200/1614* (2013.01)

(58) Field of Classification Search
None
See application file for complete search history.

(56) References Cited

U.S. PATENT DOCUMENTS

| 6,366,440 | B1 * | 4/2002 | Kung | E05C 19/16 361/147 |
| 8,223,489 | B2 * | 7/2012 | Shih | E05C 19/16 361/679.55 |
| 9,277,661 | B2 * | 3/2016 | Andre | H05K 5/0221 |
| 9,497,300 | B2 * | 11/2016 | Longo | H04M 1/0212 |
| 9,671,830 | B2 * | 6/2017 | Chen | F16M 13/005 |

(Continued)

FOREIGN PATENT DOCUMENTS

WO    2014196373    12/2014

OTHER PUBLICATIONS

"Search Report of Europe Counterpart Application", dated Jun. 5, 2018, p. 1-p. 9.

*Primary Examiner* — Xanthia C Cunningham
(74) *Attorney, Agent, or Firm* — JCIPRNET (57) ABSTRACT

A portable electronic device including a body, a stand, and first and second magnetic assemblies is provided. The stand is pivoted to the body to rotate and being opened or closed relative to the body. The first magnetic assembly having a first magnetic dipole is movably disposed in the body. The second magnetic assembly having a second magnetic dipole is disposed on the stand. When the stand is closed to the body, the first and second magnetic dipoles correspond to each other, and produce a first and second corresponding states. In the first corresponding state, magnetic poles with opposite polarities of the first and second magnetic dipoles correspond to and attract each other. In the second corresponding state, magnetic poles with the same polarity of the first and second magnetic dipoles correspond to and repel each other, and the stand is spread relative to the body due to the repulsion.

15 Claims, 8 Drawing Sheets

(56) References Cited

U.S. PATENT DOCUMENTS

| | | | |
|---|---|---|---|
| 2007/0133156 A1* | 6/2007 | Ligtenberg | G06F 1/1616 |
| | | | 361/679.27 |
| 2007/0138806 A1* | 6/2007 | Ligtenberg | E05C 19/16 |
| | | | 292/251.5 |
| 2009/0102796 A1* | 4/2009 | Harris | G06F 1/1626 |
| | | | 345/168 |
| 2009/0321609 A1* | 12/2009 | Wang | G06F 1/1626 |
| | | | 248/685 |
| 2011/0031766 A1* | 2/2011 | Huang | E05B 17/0033 |
| | | | 292/251.5 |
| 2012/0188693 A1* | 7/2012 | Chiang | F16M 11/10 |
| | | | 361/679.01 |
| 2013/0163197 A1 | 6/2013 | Mack et al. | |
| 2013/0170126 A1* | 7/2013 | Lee | G06F 1/1654 |
| | | | 361/679.17 |
| 2014/0049894 A1 | 2/2014 | Rihn et al. | |
| 2014/0376179 A1 | 12/2014 | Jenkins et al. | |
| 2017/0191608 A1* | 7/2017 | Li | F16M 13/005 |

\* cited by examiner

PORTABLE ELECTRONIC DEVICE

CROSS-REFERENCE TO RELATED APPLICATION

This application claims the priority benefit of Taiwan application serial no. 106200331, filed on Jan. 9, 2017, and Taiwan application serial no. 106201811, filed on Feb. 7, 2017. The entirety of each of the above-mentioned patent applications is hereby incorporated by reference herein and made a part of this specification.

BACKGROUND

Technical Field

The disclosure relates to a portable electronic device.

Description of Related Art

Along with development of touch panel industry, tablet computers having touch panels are widely used in people's daily life. Meanwhile, the tablet computer can be further connected to an external keyboard, such that besides a tablet computer operation mode implemented by performing operations on a touch screen is provided, an operation mode similar to that of a conventional notebook computer is further provided, which improves applicability of the tablet computer.

The existing tablet computer generally adopts a stand and a pivot mechanism to enter an input mode similar to that of the aforementioned notebook computer, though the existing stand still has to be opened or closed manually by the user, which is not convenient in usage.

SUMMARY

The disclosure is directed to a portable electronic device, where a body and a stand are disposed therein through a magnetic assembly including a magnetic dipole, so as to improved an opening/closing efficiency of the stand relative to the body to improve usage convenience.

An embodiment of the disclosure provides a portable electronic device including a body, a stand, at least one first magnetic assembly and at least one second magnetic assembly. The stand is pivoted to the body to rotate to being opened or closed relative to the body. The first magnetic assembly has a first magnetic dipole, and is movably disposed in the body. The second magnetic assembly has a second magnetic dipole, and is disposed on the stand. When the stand is closed to the body, the first magnetic dipole and the second magnetic dipole correspond to each other, and produce a first corresponding state and a second corresponding state along with movement of the first magnetic dipole in the body. In the first corresponding state, magnetic poles with opposite polarities of the first magnetic dipole and the second magnetic dipole correspond to and attract each other, such that the stand is closed to the body due to the attraction, in the second corresponding state, magnetic poles with the same polarity of the first magnetic dipole and the second magnetic dipole correspond to and repel each other, and the stand is spread relative to the body due to the repulsion.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
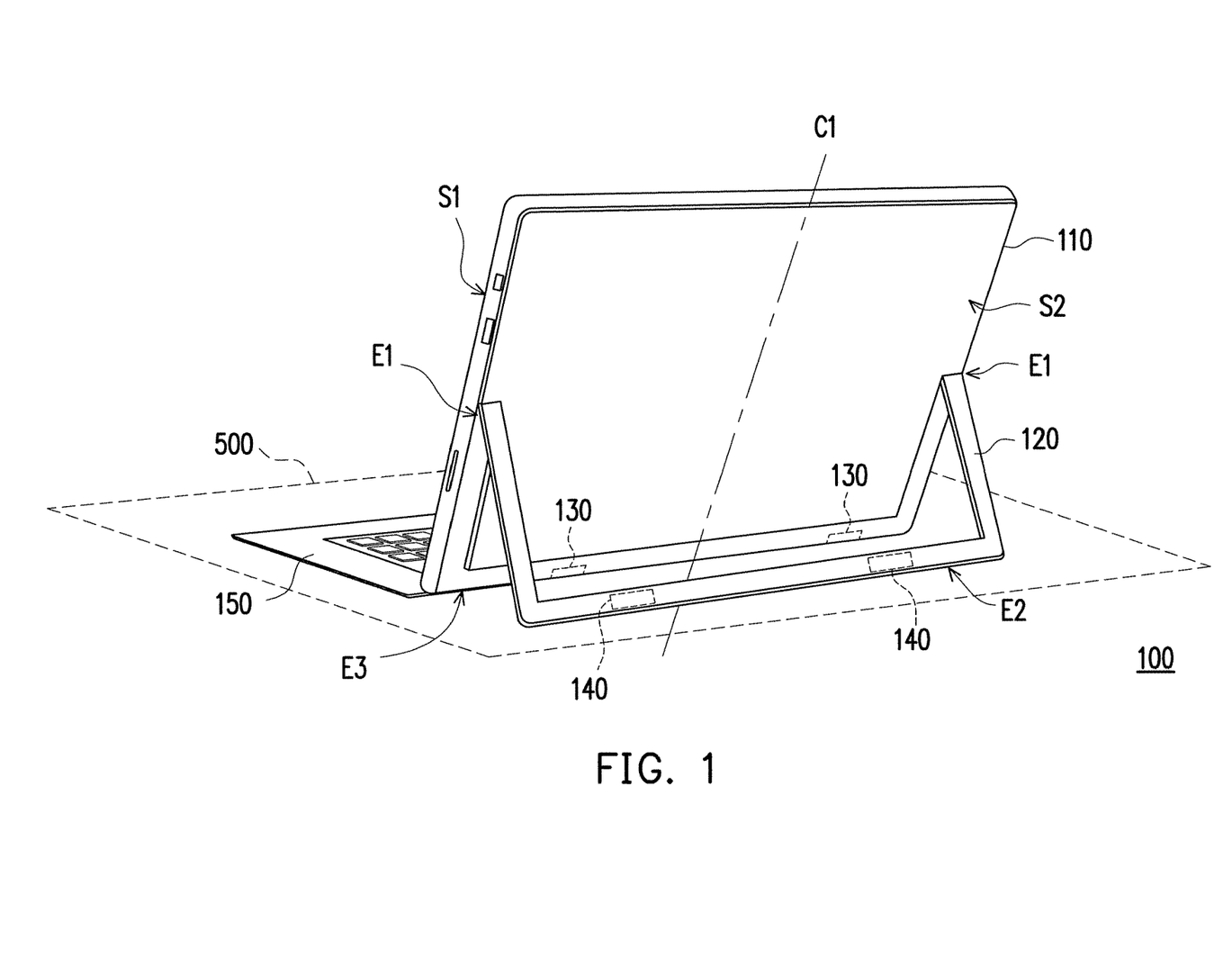
FIG. 1 is a schematic diagram of a portable electronic device according to an embodiment of the disclosure.
Figure 2:
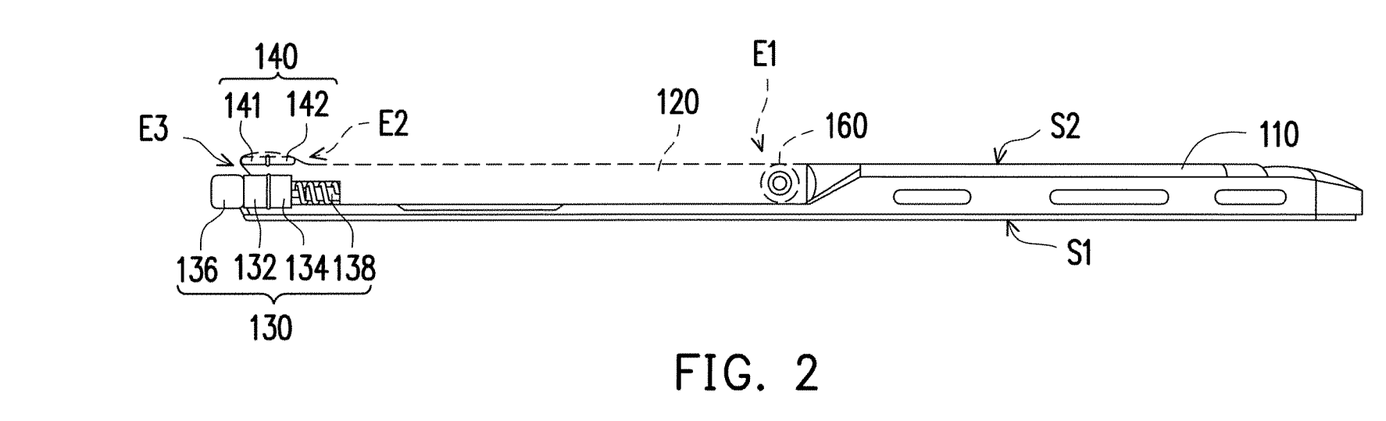
FIG. 2 and FIG. 3 are side views of the portable electronic device in different states.
Figure 3:
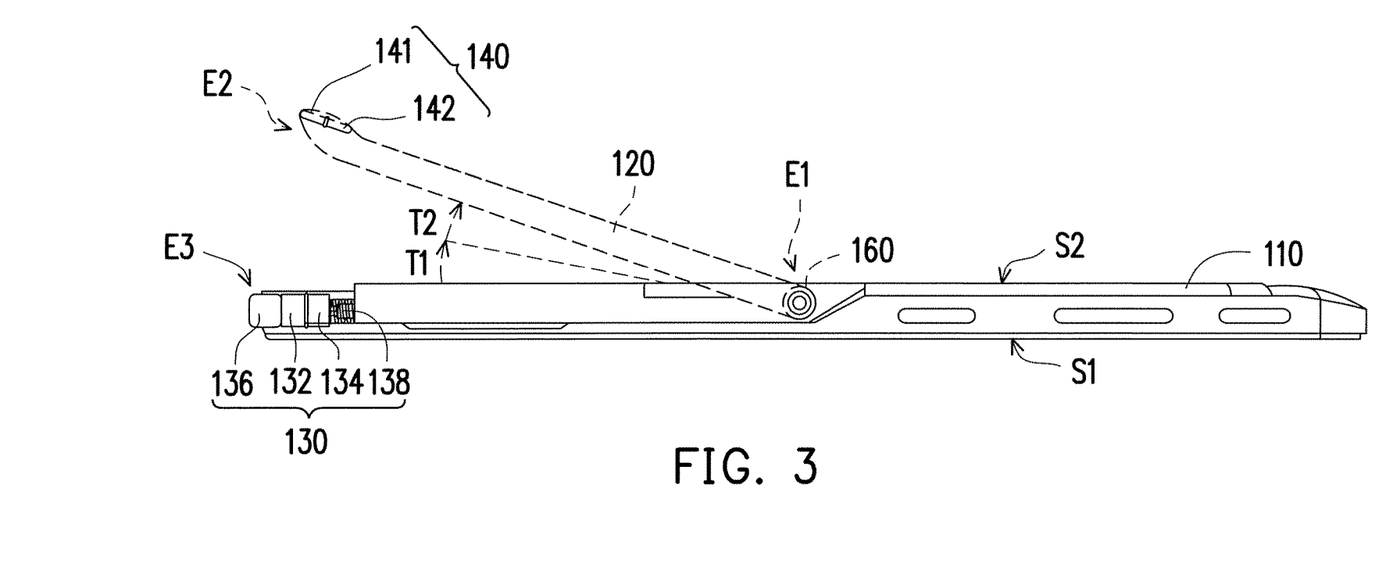

FIG. 1 is a schematic diagram of a portable electronic device according to an embodiment of the invention. FIG. 2 and FIG. 3 are side views of the portable electronic device in different states. Referring to FIG. 1 to FIG. 3, in the present embodiment, the portable electronic device 100 is, for example, a tablet computer, which includes a body 110, a stand 120, at least one first magnetic assembly 130 and at least one second magnetic assembly 140, where the first magnetic assembly 130 has a first magnetic dipole (which is composed of a first magnetic pole 132 and a second magnetic pole 134, and magnetic polarities thereof are opposite), and the second magnetic assembly 140 has a second magnetic dipole (which is composed of a third magnetic pole 142 and a fourth magnetic pole 141, and magnetic polarities thereof are opposite). Meanwhile, the first magnetic dipole (the first magnetic pole 132 and the second magnetic pole 134) are movably disposed in the body 110. In this way, by changing a corresponding state of the magnetic poles, the stand 120 and the body 110 can be driven to have a relative movement effect.

Further, the body 110 has a display surface S1 and a back surface S2 opposite to each other, where the stand 120 is pivoted to the back surface S2 of the body 110, and is used for supporting the body 110 when the stand 120 is rotated and spread, as shown in FIG. 1, the portable electronic device 100 may stand on a platform 500 through the stand 110. Meanwhile, the side of the display surface S1 is further configured with an input interface 150, by which a user may operate the portable electronic device 100 through a wired connection or wireless connection manner between the input interface 150 and the body 110 of the portable electronic device 100.

Moreover, in the present embodiment, two sets of the first magnetic assembly 130 and two sets of the second magnetic assembly 140 are taken as an example for description, i.e. in FIG. 1, the left side first magnetic assembly 130 and the right side first magnetic assembly 130 are symmetrically disposed relative to a center line C1 of the body 110. Similarly, the left side second magnetic assembly 140 and the right side second magnetic assembly 140 are also symmetrically disposed relative to the center line C1 when the stand 120 is closed to the body 110, such that when the stand 120 is closed to the body 110, the first magnetic assemblies 130 and the second magnetic assemblies 140 are located adjacent to each other and correspond to each other, which avails implementation of subsequent operations. In the following description, only one of the first magnetic assemblies 130 and one of the second magnetic assemblies 140 are taken as an example for description.

Referring to FIG. 2 and FIG. 3, which respectively present different states of the portable electronic device 100 when the stand 120 is closed to the body 110 and spread relative to the body 110. In detail, in the present embodiment, the first magnetic dipole (the first magnetic pole 132 and the second magnetic pole 134) of the first magnetic assembly 130 is movably disposed in the body 110, and is located at a side edge E3 of the body 110. The stand 120 has a first end E1 and a second end E2 opposite to each other, where the first end E1 is pivoted to the body 110, and the second magnetic dipole (the third magnetic pole 142 and the fourth magnetic pole 141) is disposed at the second end E2 of the stand 120 to move away from or close to the body 110 along with rotation of the stand 110 relative to the body 110, where the first magnetic pole 132 and the third magnetic pole 142 have the same magnetic polarity, and the second magnetic pole 134 and the fourth magnetic pole 141 have the same magnetic polarity. When the stand 110 is closed to the body 110, the second magnetic dipole (the third magnetic pole 142 and the fourth magnetic pole 141) located at the second end E2 may correspond to the first magnetic dipole (the first magnetic pole 132 and the second magnetic pole 134) located at the side edge E3 of the body 110, and have a first corresponding state and a second corresponding state along with a position of the first magnetic dipole (the first magnetic pole 132 and the second magnetic pole 134) in the body 110.

Figure 4:
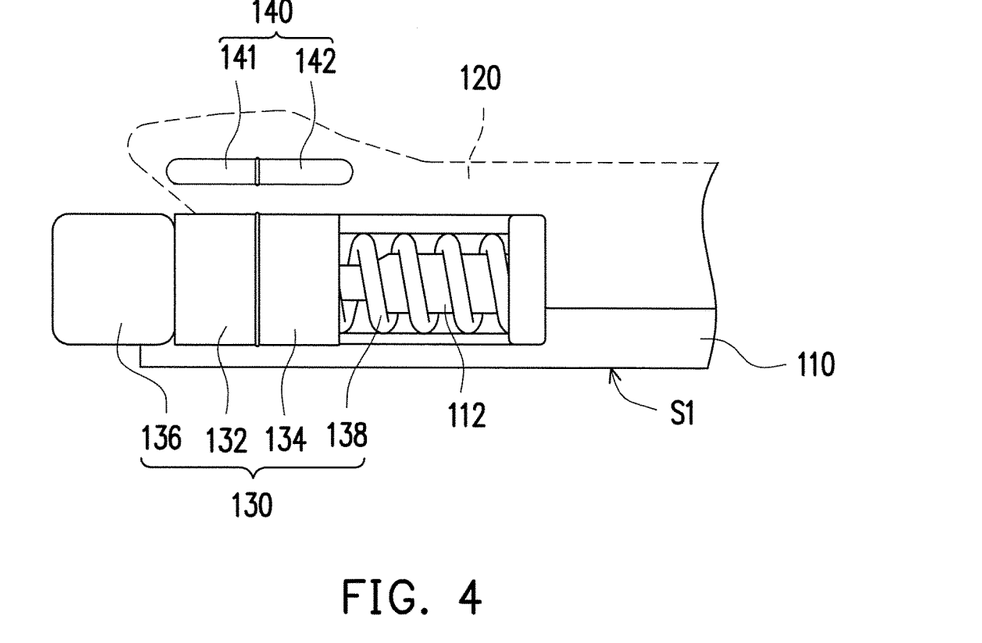
FIG. 4 and FIG. 5 are partial schematic diagrams of the portable electronic device in different states.
Figure 5:
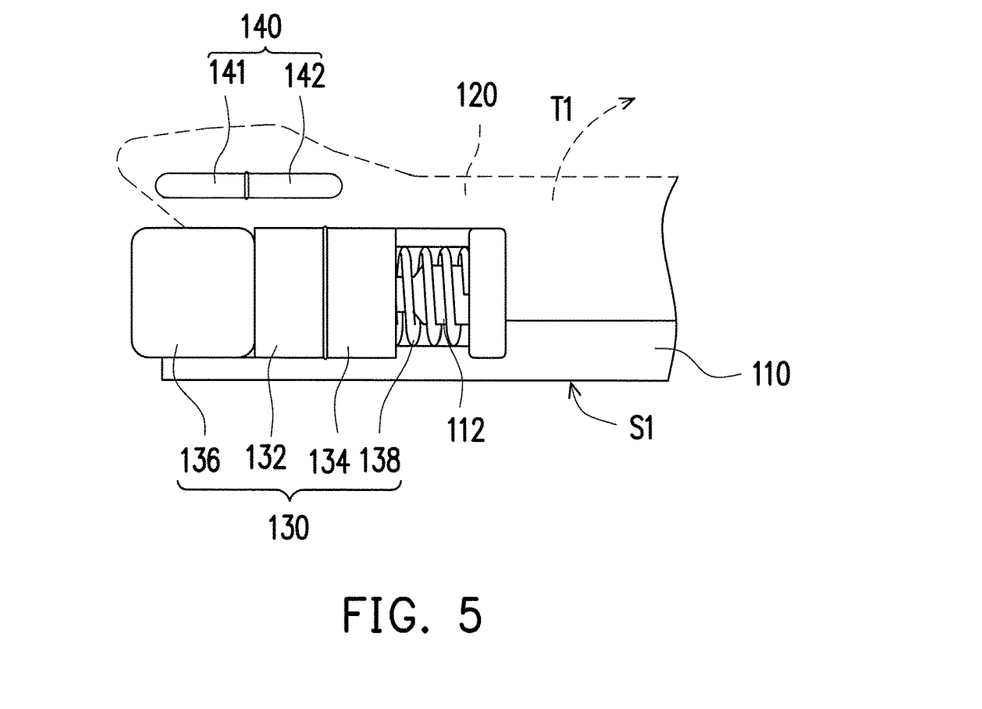

FIG. 4 and FIG. 5 are partial schematic diagrams of the portable electronic device in different states. Referring to FIG. 4 and FIG. 5 in comparison with FIG. 2 and FIG. 3, where the state shown in FIG. 4 and the state shown in FIG. 2 are the same, i.e. the aforementioned first corresponding state. In the present embodiment, an axial direction (as shown in FIG. 2 and FIG. 3, the axial direction is perpendicular to a paper surface) along which the stand 120 is pivoted the body 110 is orthogonal to an axial direction (as shown in FIG. 2 and FIG. 3, the axial direction is horizontally parallel to the paper surface) along which the first magnetic dipole (the first magnetic pole 132 and the second magnetic pole 134) is moved in the body 110.

Further, the first magnetic assembly 130 further includes a push member 136 and an elastic member 138, where the push member 136 is movably disposed on the body 110 to protrude out of the body 110 or retract into the body 110, and the first magnetic dipole (the first magnetic pole 132 and the second magnetic pole 134) is linked to the push member 136, such that the first magnetic pole 132 and the second magnetic pole 134 can be driven by the push member 136 to move in the body 110. The elastic member 138 is disposed in the body 110 and sleeves a guide shaft 112, and the elastic member 138 is situated between the body 110 and the second magnetic pole 134. The push member 136 is adapted to receive an external force to retract into the body 110, such that the first magnetic dipole (the first magnetic pole 132 and the second magnetic pole 134) is moved to deform the elastic member 138, as shown in FIG. 5, then an elastic restoring force of the elastic member 138 is used for driving the first magnetic dipole (the first magnetic pole 132 and the second magnetic pole 134) to push the push member 136 out of the body 110, as shown in FIG. 4.

According to the above description, when the user wants to switch the portable electronic device 100 from an operation state of a tablet computer to an operation state of a notebook computer, the user may hold the body 110 by hand and make the side edge E3 to face downwards, such that the side edge E3 is leaned against the platform 500 (shown in FIG. 1). Then the user pushes the push member 136 to drive the first magnetic dipole (the first magnetic pole 132 and the second magnetic pole 134) to move and change a position thereof in the body 110, i.e. to change from the state of FIG. 4 to the state of FIG. 5, such that the first magnetic pole 132 of the first magnetic dipole corresponds to the third magnetic pole 142 of the second magnetic dipole to cause a state of like polarity repulsion, i.e. the aforementioned second corresponding state, and the stand 120 is moved away from the body 110 by a stroke T1 through a magnetic repulsion force. Conversely, when the stand 120 is closed to the body 110, through the first magnetic pole 132 and the fourth magnetic pole 141 with different polarities, and the second magnetic pole 134 and the third magnetic pole 142 with different polarities, the stand 120 can be attracted to the back surface S2 of the body 110 through a magnetic attraction force, i.e. the aforementioned first corresponding state.

Moreover, referring to FIG. 2 and FIG. 3, the portable electronic device 100 of the present embodiment further includes a torsion spring 160 disposed at a pivot joint (at the first end E1) of the stand 120 and the body 110, and the torsion spring 160 constantly drives the stand 120 to spread relative to the body 110. Namely, when the stand 110 is moved away from the body 110 by the stroke T1 due to the magnetic repulsion force, the torsion sprint 160 may drive the stand 110 to move away from back surface S2 of the body 110 by a stroke T2 through an elastic force thereof. In this way, the user may make the stand 120 to spread relative to the body 110 by pressing the side edge E3 of the body 110. The stand 120 completes spreading can be further spread by other angles relative to the body 110 through a pivot structure (not shown), which is not repeated. The push member 136 and the first magnetic dipole (the first magnetic pole 132 and the second magnetic pole 134) may restore its position by the elastic restoring force of the elastic member 138 after the second end E2 of the stand 120 is moved away from the body 110, so as to restore the state of FIG. 4.

Figure 6:
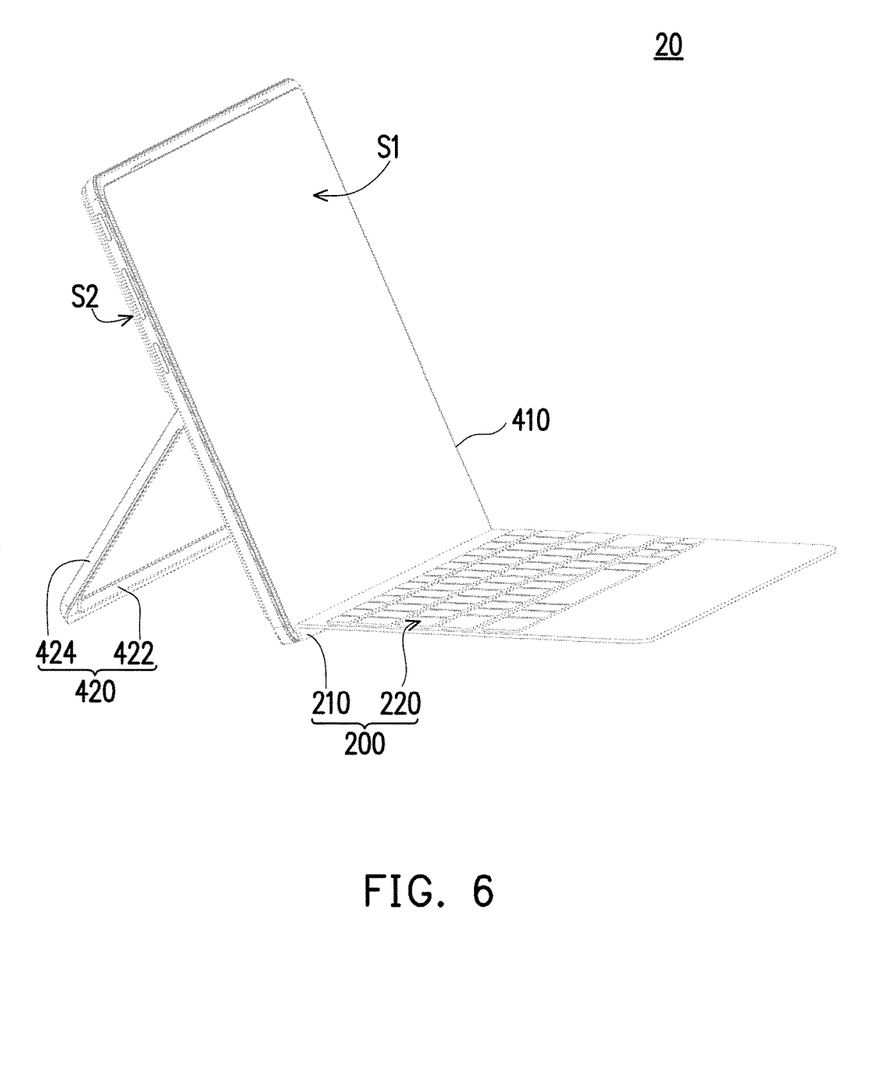
FIG. 6 is a schematic diagram of a portable electronic device according to another embodiment of the disclosure.
Figure 7:
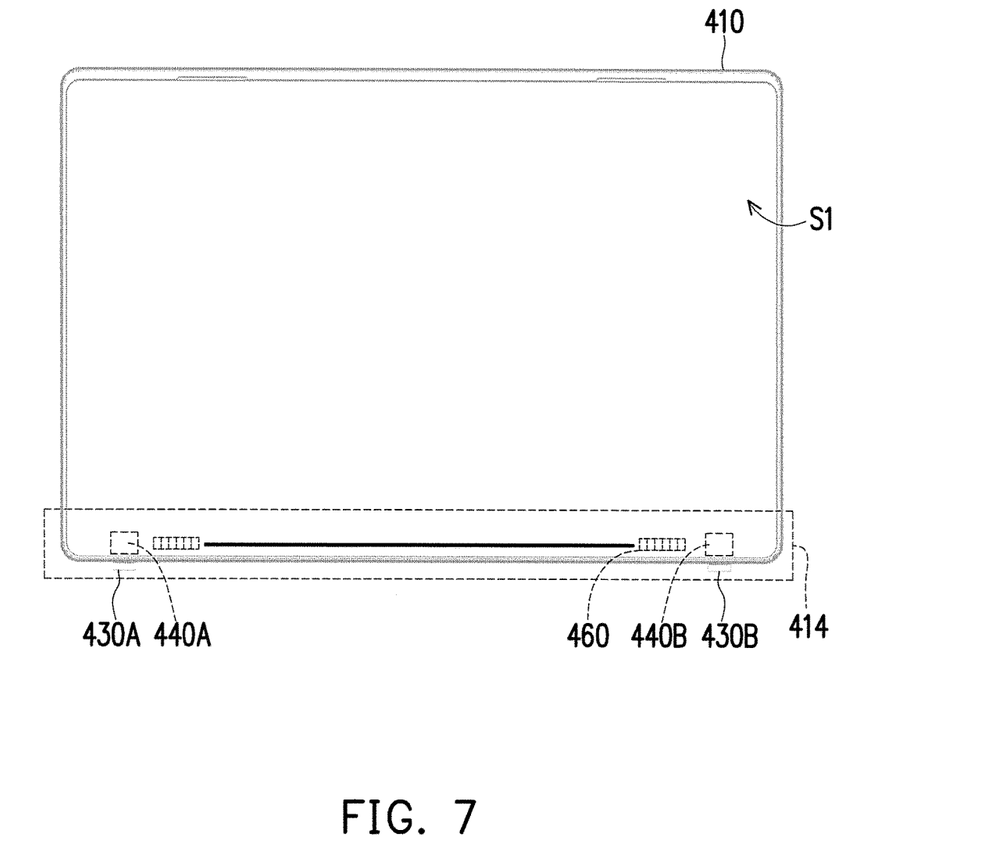
FIG. 7 is a front view of the portable electronic device of FIG. 6.

FIG. 6 is a schematic diagram of a portable electronic device according to another embodiment of the invention. FIG. 7 is a front view of the portable electronic device of FIG. 6. Referring to FIG. 6 and FIG. 7, in the present embodiment, the portable electronic device 20 is, for example, a tablet computer, and a body 410 thereof has a display surface S1 and a back surface S2 opposite to each other. A stand 420 includes a side bar 424 and a bottom bar 422, where the side bar 424 is pivoted to the body 410 and is adapted to be opened/closed relative to the body 410, and in a spread state shown in FIG. 6, the portable electronic device 20 can be supported on a platform (not shown, referring to the platform 500 of the aforementioned embodiment) through the bottom bar 422, such that the portable electronic device 20 is in a watch mode. Moreover, the portable electronic device 20 further includes an input interface 200, which is detachably assembled to a bottom part 414 of the body 410, such that an operation mode suitable for the user to input through keys is further provided during the watch mode, and the portable electronic device 20 is further changed to an operation mode of the notebook computer.

Figure 8:
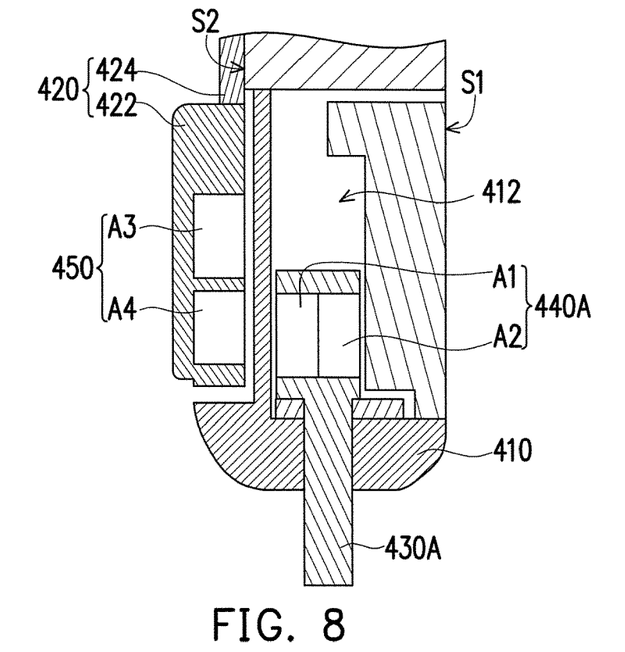
FIG. 8 and FIG. 9 are respectively partial cross-sectional views of the portable electronic device of FIG. 6.
Figure 9:
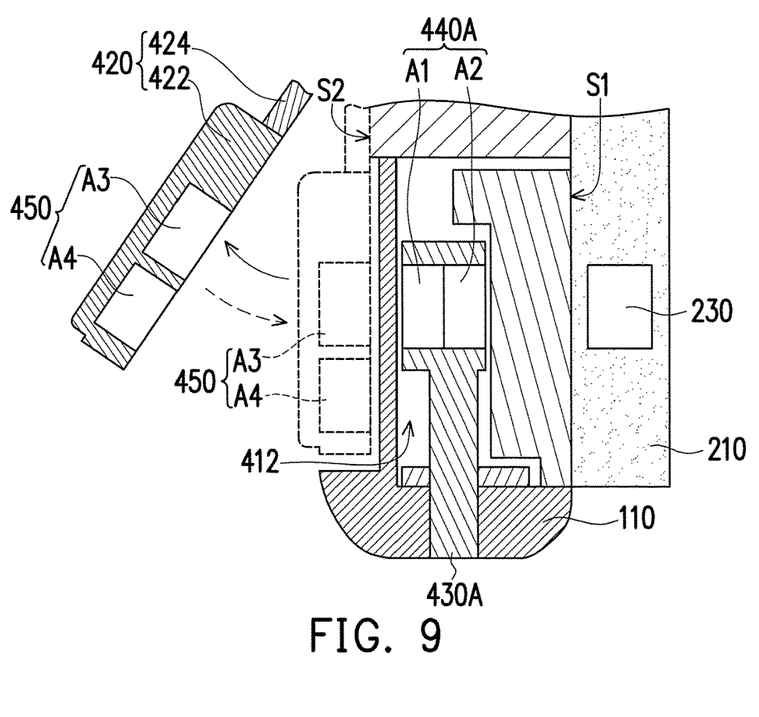

FIG. 8 and FIG. 9 are respectively partial cross-sectional views of the portable electronic device of FIG. 6, which respectively illustrate a change of the stand and the push member of the portable electronic device in different states. Referring to FIG. 7 to FIG. 9, in the present embodiment, the portable electronic device 20 further includes at least one push member (a pair of push members 430A, 430B is taken as an example for description), which is movably assembled to the body 410 to stretch out of or merge into the body 410. As shown in FIG. 8 and FIG. 9, the body 410 has an accommodation space 412 located at the bottom part 414 for accommodating the push members 430A, 430B. Moreover, the portable electronic device 20 further includes a first magnetic dipole 440A disposed in the push member 430A and a second magnetic dipole 450 disposed in the stand 420, where the first magnetic dipole 440A and the second magnetic dipole 450 may correspond to each other along with a moving path of the push member 430A and a moving path of the stand 420 to produce a magnetic force, and the push member 430A and the stand 420 may interact with each other due to the magnetic force. The state shown in FIG. 8 is regarded as that the first magnetic dipole 440A is in a first position, and the state shown in FIG. 9 is regarded as that the first magnetic dipole 440A is in a second position.

It should be noted that as shown in FIG. 7, the portable electronic device 20 of the present embodiment includes the pair of push members 430A, 430B disposed on the body 410 and located in symmetric positions, and in following FIG. 8 and FIG. 9, only the push member 430A and the first magnetic dipole 440A of one side are taken as an example for description, and the push member 430B and the first magnetic dipole 440B of the other side have the same components and configuration relationship, and detail thereof is not repeated.

Referring to FIG. 8 and FIG. 9, in general, when the push member 430A is changed from a state stretching out of the body 410 to a state merging into the body 410 (from the state shown in FIG. 8 to the state shown in FIG. 9), the first magnetic dipole 440A may correspond to the second magnetic dipole 450 to produce a magnetic repulsion force, so as to drive the stand 420 to spread relative to the body 410, and when the stand 420 is closed to the body 410 under an external force, the second magnetic dipole 450 may correspond to the first magnetic dipole 440A to generate the magnetic repulsion force, so as to drive the push member 430A to stretch out of the body 410 (from the state shown in FIG. 9 to the state shown in FIG. 8).

In detail, the first magnetic dipole 440A has a first magnetic pole A1 and a second magnetic pole A2 with opposite magnetic polarities, where the first magnetic pole A1 is close to the back surface S2 of the body 410, and the second magnetic pole A2 is close to the display surface S1 of the body 410, i.e. a configuration axial direction (a horizontal axial direction of FIG. 8 and FIG. 9) of the first magnetic pole A1 and the second magnetic pole A2 is orthogonal to the display surface S1. The second magnetic dipole 450 has a third magnetic pole A3 and a fourth magnetic pole A4 with opposite magnetic polarities, which are disposed at the bottom bar 422 and disposed along an extending direction of the side bar 424. The third magnetic pole A3 and the first magnetic pole A1 have the same magnetic polarity (i.e. first magnetic pole A1 and the fourth magnetic pole A4 have different magnetic polarities).

In this way, referring to FIG. 7 and FIG. 8, the states shown in FIG. 7 and FIG. 8 are consistent, i.e. when the portable electronic device 20 is in a tablet mode, the push members 430A and 430B are in a state protruding out from the bottom of the body 410, and now the first magnetic dipole 440A is located at the second position and the stand 420 is closed to the body 410, and the first magnetic pole A1 corresponds to the fourth magnetic pole A4 to produce a magnetic attraction force, so as to achieve an effect that the stand 420 is attracted to the body 410 (the stand 420 is substantially attracted to the push member 430A and is regarded as being attracted to the body 410), and meanwhile the push member 430A is maintained in the protruding state. In this case, a configuration axial direction of the first magnetic pole A1, the second magnetic pole A2 and the fourth magnetic pole A4 is orthogonal to a configuration axial direction of the third magnetic pole A3 and the fourth magnetic pole A4, i.e. orthogonal to the display surface S1.

Then, when the portable electronic device 20 is about to be changed from the state shown in FIG. 7 to the state shown in FIG. 6, the user only requires to hold the body 410 by hand (for example, a left hand and a right hand of the user respectively hold the left side and the right side of the body 410 shown in FIG. 7) and exerts a force downwards to make the push members 430A, 430B to lean against the platform (for example, the platform 500 of the aforementioned embodiment), such that the push members 430A, 430B merge into the body 410 to change from the state shown in FIG. 8 to the state shown in FIG. 9. Since the push member 430A is accordingly accommodated in the accommodation space 412, the first magnetic pole A1 of the first magnetic dipole 440A thereon is moved from a position corresponding to the fourth magnetic pole A4 to a position corresponding to the third magnetic pole A3, i.e. the first magnetic dipole 440A is moved from the second position to the first position to produce a magnetic repulsion force, the bottom bar 422 is driven to move away from the body 410, i.e. the stand 420 is pivotally spread relative to the body 410. In this way, the body 410 of the portable electronic device 20 may stand on the platform through support of the stand 420 as that shown in FIG. 6.

Meanwhile, the input interface 200 of the present embodiment includes an input portion 220 and a magnetic attraction portion 210, and when the user approaches the magnetic attraction portion 210 of the input interface 200 to the bottom part 414 of the body 410, as shown in FIG. 9, a magnetic unit 230 of the magnetic attraction portion 210 corresponds to the second magnetic pole A2 of the first magnetic dipole 440A to produce the magnetic attraction force, and the input interface 200 is attracted to the bottom part 414 of the body 410 through the magnetic attraction portion 210. The magnetic unit 230 is, for example, a magnetic guide element or a magnetic element with the magnetic polarity opposite to that of the second magnetic pole A2, and a configuration axial direction of the first magnetic pole A1, the second magnetic pole A2 and the magnetic unit 230 is orthogonal to the display surface S1.

Moreover, when the user wants to restore the portable electronic device 20 from the state shown in FIG. 9 to the state shown in FIG. 8, the user only requires to exert a force to the stand 420 to make the stand 420 to be closed to the back surface S2 of the body 410, and now the third magnetic pole A3 corresponds to the first magnetic pole A1 to produce the magnetic repulsion force as the user exerts the force to close the stand 420 to the body 410, so as to drive the push member 430A to move and protrude out of the body 410. Meanwhile, since the magnetic attraction force generated by the second magnetic pole A2 and the magnetic unit 230 is smaller than the magnetic repulsion force generated by the first magnetic pole A1 and the third magnetic pole A3, the operation of closing the stand 420 to the body 410 may successfully make the push member 430A to break away from the magnetic attraction effect of the input interface 200, so as to restore the push member 430A to the state shown in FIG. 8, and now the input interface 200 may be successfully moved away from the body 410.

Referring to FIG. 7, in the present embodiment, the portable electronic device 20 further includes a plurality of third magnetic members 460 arranged at the bottom part 414 of the body 410 and located between the pair of push members 430A, 430B (equivalent to be located between the pair of first magnetic dipoles 440A and 440B). The third magnetic members 460 are configured to correspond to the magnetic attraction portion 210 of the input interface 200 to generate the magnetic attraction force, so as to improve a bonding strength between the input interface 200 and the body 410.

Figure 10:
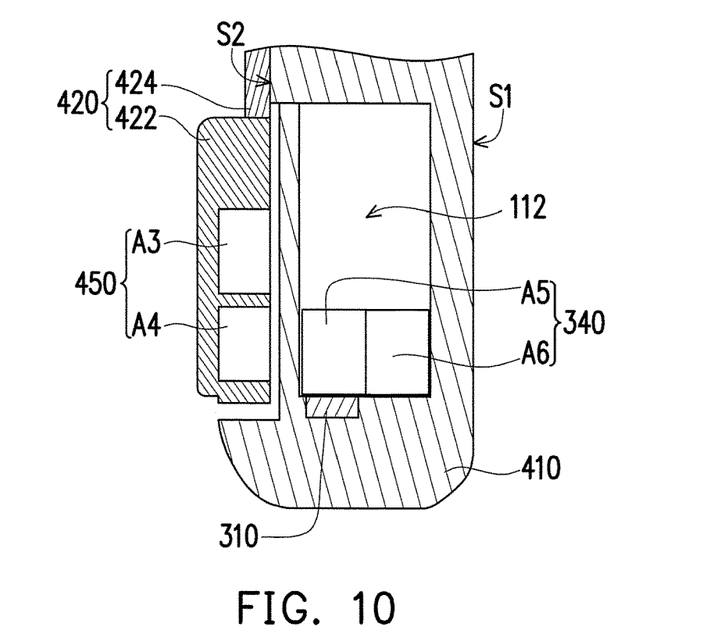
FIG. 10 and FIG. 11 are respectively partial cross-sectional views of a portable electronic device according to another embodiment of the disclosure.
Figure 11:
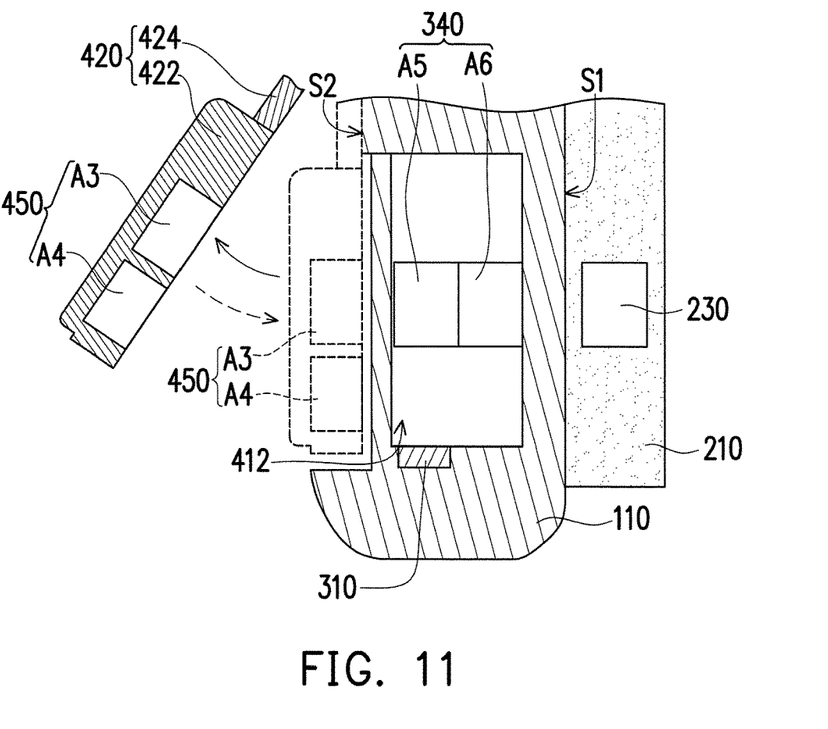
Figure 12:
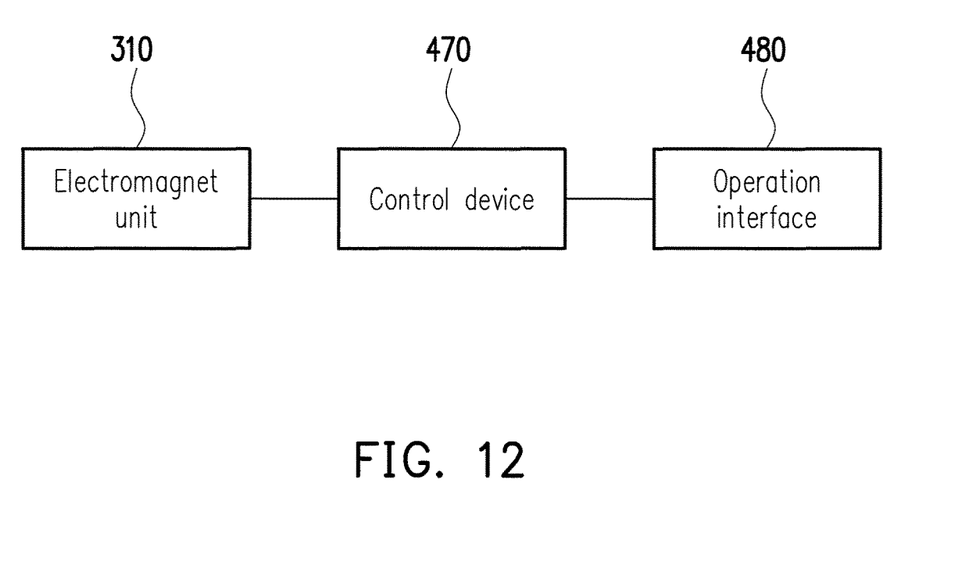
FIG. 12 is a diagram illustrating an electrical connection relationship of a part of components in FIG. 10 and FIG. 11.

FIG. 10 and FIG. 11 are respectively partial cross-sectional views of a portable electronic device according to another embodiment of the invention. FIG. 12 is a diagram illustrating an electrical connection relationship of a part of the components in FIG. 10 and FIG. 11. Referring to FIG. 10 to FIG. 12, different to the aforementioned embodiment, the portable electronic device of the present embodiment adopts an electromagnet unit 310 to replace a physical button (the push member 430A) of the aforementioned embodiment. Namely, in the present embodiment, the first magnetic dipole 340 is driven to move in the accommodation space 412 of the body 410 according to whether the electromagnet unit 310 produces a magnetic force, and regarding a moving mode of the first magnetic dipole 340, the first magnetic dipole 340 is also switched between the first position and the second position as that does in the aforementioned embodiment, so that the aforementioned effect of driving the stand 420 to be opened/closed to the body 410 or attracting/deattracting the input interface 200 is also achieved.

Moreover, similar to the aforementioned embodiment, the first magnetic dipole 340 also has a fifth magnetic pole A5 and a sixth magnetic pole A6 with opposite magnetic polarities, though the electromagnet unit 310 only corresponds to one of the magnetic poles (for example, corresponds to the fifth magnetic pole A5, though the invention is not limited thereto). Moreover, as show in FIG. 12, a control device 470 is electrically connected to the electromagnet unit 310 to achieve the purpose of driving the electromagnet unit 310. Meanwhile, the portable electronic device of the present embodiment is electrically connected to the control device 470 through an operation interface 480, such that the user may control the electromagnet unit 310 through the operation interface 480 (including an entity, a virtual operation device or the input interface 200 of the aforementioned embodiment), so as to achieve the effect of driving the stand 420 or the input interface 200 in structure.

In summary, in the aforementioned embodiments, the first magnetic assembly and the second magnetic assembly composed of the first magnetic dipole and the second magnetic dipole are respectively disposed on the body and the stand, where the first magnetic dipole is movably disposed in the body, such that open and close of the stand relative to the body can be controlled through corresponding states of the first and second magnetic dipoles. In the first corresponding state, the first magnetic dipole is moved to a position where the magnetic pole thereof may correspond to the magnetic pole of the second magnetic dipole with the opposite polarity, so as to achieve a magnetic attraction effect, and the stand may be closed to the body. In the second corresponding position, the first magnetic dipole is moved to a position where the magnetic pole thereof may correspond to the magnetic pole of the second magnetic dipole with the same polarity, so as to achieve a magnetic repulsion effect, and provide a magnetic attraction effect to the input interface.

In this way, the user may exert a force on one of the push member and the stand to smoothly drive the other one of the push member and the stand. Namely, the user is unnecessary to pull out or close the stand by hand, so as to effectively improve usage efficiency of the portable electronic device and achieve an effort-saving effect.

Moreover, based on the component configuration of the magnetic dipoles, besides the magnetic members originally set on the body, the input interface may also achieve the magnetic attraction effect through the magnetic members on the button, so as to improve the bonding strength of the components. Namely, in the portable electronic device, the attraction strength of the input interface is not decreased due to configuration of the push member, but the attraction effect required by the input interface can still be achieved through the magnetic dipole set on the push member.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A portable electronic device, comprising:
a body;
a stand, pivoted to the body to be opened or closed;
at least one first magnetic assembly, having a first magnetic dipole, and movably disposed in the body;
at least one second magnetic assembly, having a second magnetic dipole, and disposed on the stand, wherein when the stand is closed to the body, the first magnetic dipole and the second magnetic dipole correspond to each other, and produce a first corresponding state and a second corresponding state along with movement of the first magnetic dipole in the body, in the first corresponding state, magnetic poles with opposite polarities of the first magnetic dipole and the second magnetic dipole correspond to and attract each other, such that the stand is closed to the body due to the attraction, in the second corresponding state, magnetic poles with a same polarity of the first magnetic dipole and the second magnetic dipole correspond to and repel each other, and the stand is spread relative to the body due to the repulsion; and
an input interface, having an input portion and a magnetic attraction portion, wherein in the second corresponding state, the magnetic attraction portion corresponds to the first magnetic dipole to produce a magnetic attraction force, such that the input interface is attracted to the body, and in the first corresponding state, a magnetic repulsion force produced when the second magnetic dipole corresponds to the first magnetic dipole is greater than the magnetic attraction force produced when the first magnetic dipole corresponds to the magnetic attraction portion, so as to release the attraction of the input interface and the body.

2. The portable electronic device as claimed in claim 1, wherein the first magnetic assembly further comprises a push member movably disposed in the body to protrude out of or retract into the body, and the first magnetic dipole is linked to the push member.

3. The portable electronic device as claimed in claim 2, wherein the first magnetic assembly further comprises an elastic member disposed in the body and situated between the body and the first magnetic dipole, when the push member is retracted into the body by a force, the first magnetic dipole deforms the elastic member, and an elastic restoring force of the elastic member drives the first magnetic dipole to push the push member out of the body.

4. The portable electronic device as claimed in claim 1, wherein an axial direction along which the stand is pivoted to the body is orthogonal to an axial direction along which the first magnetic dipole is moved in the body.

5. The portable electronic device as claimed in claim 1, wherein the stand has a first end and a second end opposite to each other, the first end is pivoted to the body, the second magnetic dipole is disposed at the second end, and the first magnetic dipole is located at a side edge of the body to correspond to the second magnetic dipole, the body is adapted to lean against a platform through the side edge, so as to drive the first magnetic dipole to switch to the second corresponding state to make the stand to spread relative to the body, such that the body is adapted to stand on the platform through the side edge and the second end.

6. The portable electronic device as claimed in claim 1, wherein the at least one first magnetic assembly comprises a pair of first magnetic assemblies symmetrically disposed relative to a center line of the body, and the at least one second magnetic assembly comprises a pair of second magnetic assemblies, wherein when the stand is closed to the body, the pair of the second magnetic assemblies are symmetrically disposed relative to the center line of the body.

7. The portable electronic device as claimed in claim 1, further comprising:
a torsion spring, disposed at a pivot joint of the stand and the body, wherein the torsion spring constantly drives the stand to spread relative to the body.

8. The portable electronic device as claimed in claim 1, wherein the first magnetic assembly further comprises a push member movably disposed in the body to protrude out of or retract into the body, the first magnetic dipole comprises a first magnetic pole and a second magnetic pole with opposite polarities and disposed on the push member, and the second magnetic dipole comprises a third magnetic pole and a fourth magnetic pole with opposite polarities, wherein when the stand is closed to the body, a configuration axial direction of the first magnetic pole and the second magnetic pole is orthogonal to a configuration axial direction of the third magnetic pole and the fourth magnetic pole.

9. The portable electronic device as claimed in claim 1, wherein the first magnetic dipole comprises a first magnetic pole and a second magnetic pole with opposite polarities, and a configuration axial direction of the first magnetic pole and the second magnetic pole is orthogonal to a display surface of the portable electronic device.

10. The portable electronic device as claimed in claim 1, wherein the first magnetic dipole comprises a first magnetic pole and a second magnetic pole with opposite polarities, and the second magnetic dipole comprises a third magnetic pole and a fourth magnetic pole with opposite polarities, in the second corresponding state, the magnetic attraction portion corresponds to the second magnetic pole to produce the magnetic attraction force and the first magnetic pole and the third magnetic pole produce the magnetic repulsion force, and in the first corresponding state, the fourth magnetic pole and the first magnetic pole generates the magnetic attraction force.

11. The portable electronic device as claimed in claim 10, wherein the magnetic attraction portion is a magnetic conductance element or a magnetic element with magnetism opposite to the second magnetic pole.

12. The portable electronic device as claimed in claim 1, wherein the first magnetic dipole comprises a first magnetic pole and a second magnetic pole with opposite polarities, and in the second corresponding state, the first magnetic pole, the second magnetic pole and the magnetic attraction portion are located in a same axial direction, and the axial direction is orthogonal to a display surface of the portable electronic device.

13. The portable electronic device as claimed in claim 1, wherein the at least one first magnetic assembly comprises a pair of first magnetic assemblies, and the portable electronic device further comprises a third magnetic assembly disposed on the body and corresponding to the magnetic attraction portion to produce the magnetic attraction force, and the third magnetic assembly is located between the pair of the first magnetic assemblies.

14. The portable electronic device as claimed in claim 1, further comprising an electromagnet unit and a control device, the electromagnet unit is disposed on the body and corresponds to the first magnetic assembly, the control device is electrically connected to the electromagnet unit, and drives the first magnetic assembly to move in the body by controlling the electromagnet unit to produce a magnetic force or not.

15. The portable electronic device as claimed in claim 14, wherein the electromagnet unit only corresponds to one of the magnetic poles of the first magnetic dipole.

* * * * *